No. 803,462. PATENTED OCT. 31, 1905.
C. E. BARRY.
ALTERNATING CURRENT MOTOR CONTROL.
APPLICATION FILED JUNE 24, 1904.
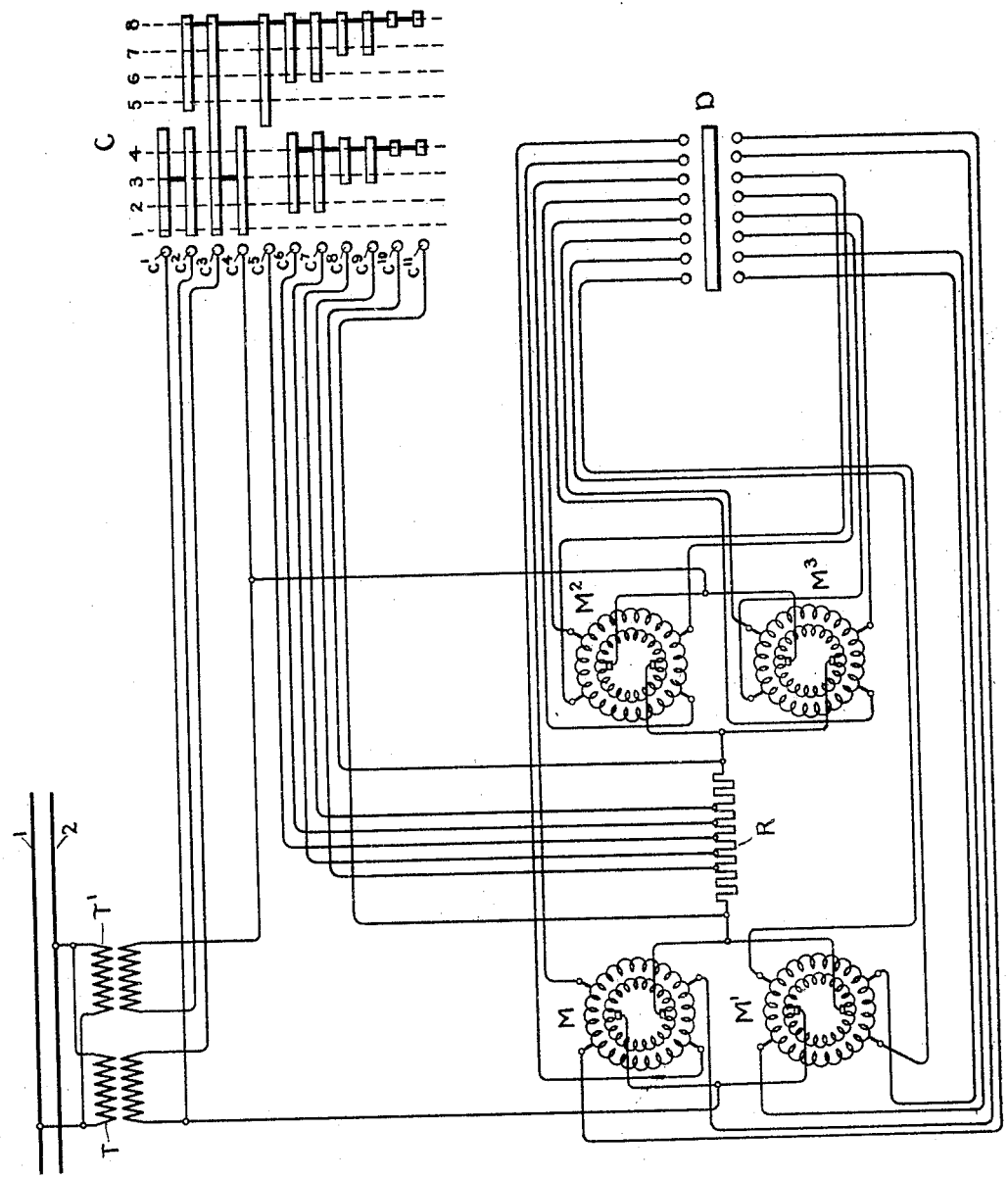
Witnesses
J. Ellis Glen.
Helen Orford
Inventor.
Charles E. Barry.
By Albert G. Davis
Atty.

UNITED STATES PATENT OFFICE.

CHARLES E. BARRY, OF SCHENECTADY, NEW YORK, ASSIGNOR TO GENERAL ELECTRIC COMPANY, A CORPORATION OF NEW YORK.

ALTERNATING-CURRENT-MOTOR CONTROL.

No. 803,462.　　　　Specification of Letters Patent.　　　　Patented Oct. 31, 1905.

Application filed June 24, 1904. Serial No. 213,942.

*To all whom it may concern:*

Be it known that I, CHARLES E. BARRY, a citizen of the United States, residing at Schenectady, county of Schenectady, State of New York, have invented certain new and useful Improvements in Alternating-Current-Motor Control, of which the following is a specification.

My invention relates to the control of alternating-current motors, and is particularly applicable to the control of motors in which the current from the supply-circuit is commutated, such as the series or "inverted" repulsion-motor. In the latter type of motor current is supplied to the armature by means of brushes on the commutator, and the field is short-circuited on a line at an angle to the line of magnetization produced by the armature-current. This type of motor has certain advantages over the ordinary repulsion-motor as regards power factor and efficiency. It has the disadvantage, however, in ordinary systems of control in which the motors are connected in series and in parallel that since the current from the supply-circuit is commutated the voltage is necessarily low in order to secure proper commutation and the current to be controlled is large, requiring heavy connections and large and cumbersome control-switches.

The object of my invention is to provide a simple and efficient system of control adapted for the control of a vehicle or train propelled by alternating-current motors, which renders it unnecessary to change the connections of the motors. The motors may be consequently maintained permanently in series and the amount of current in the motor-circuit maintained at its minimum value.

My invention consists in providing means for varying the voltage impressed upon the motor-circuit and for varying the resistance in the motor-circuit. More specifically considered, my invention consists in supplying the motors from two independent sources of current—such, for instance, as the secondaries of two transformers or two independent secondaries of a single transformer—and providing a switch adapted to connect these secondaries in parallel and in series, so as to vary the potential impressed upon the motor-circuit, together with means for varying the resistance in the motor-circuit. Still more specifically considered, my invention consists in the combination, with a plurality of motors connected permanently in series with each other and with a resistance, of two independent sources of voltage, together with a controlling-switch adapted to connect the sources in parallel and in series and to vary the amount of resistance in the motor-circuit.

My invention will best be understood from the accompanying drawing, in which—

M, M', M$^2$, and M$^3$ represent four inverted repulsion-motors which are permanently connected in series parallel, the motors M M' being connected in parallel with each other and forming one group connected in series with the group formed by the motors M$^2$ and M$^3$. The resistance R is also permanently connected in series with the motors. The current for the motors is obtained from the secondaries of the two transformers T T'. Instead of employing two transformers it is obvious that the two secondaries of a single transformer may be employed.

1 2 represent the source of current for the transformers T T'.

C represents a controlling-switch adapted to connect the secondaries of the transformers in series and in parallel and to vary the amount of resistance R in the motor-circuit.

D represents a reversing-switch adapted to short-circuit the fields of the motors on either of two lines at an angle to the magnetization produced by the current in the armature, so as to reverse the direction of rotation of the motors.

The circuit connections are as follows: With the reversing-switch D moved into either closed position if the controlling-switch C is moved to its first position the secondaries of the two transformers will be connected in parallel, the left-hand terminals being connected through the contacts $c'$ and $c^2$ and the right-hand terminals through the contacts $c^3$ and $c^4$. Current consequently flows from the left-hand terminals of the transformers through motors M M' in parallel, through the whole of resistance R, through motors M$^2$ and M$^3$ in parallel, to the right-hand terminal of the transformers. When controlling-switch C is moved to position 2, the two central sections of the resistance R are short-circuited by contacts $c^6$ and $c^7$. In the third position two more sections are short-circuited by contacts $c^8$ and $c^9$. In the fourth position the rest of resistance R is short-circuited by contacts $c^{10}$ and $c^{11}$. Thus in this position of the controlling-switch the motors are connected with no resistance in circuit, and the transformers are in parallel.

As controlling-switch C is moved from position 4 to position 5 the resistance is again introduced into the motor-circuit and the central point of the resistance is connected, by means of contact $c^5$, to the right-hand terminals of the transformers, short-circuiting motors $M^2$ and $M^3$. The circuit of transformer T' is opened, at the same time opening the short circuit, and the secondary of transformer T' is then connected across the terminals of motors $M^2$ and $M^3$, with half the resistance in series. This connection in position 5 places the two transformers in series and connects them to the motors in series, with all the resistance in circuit. The lead from the central point of the resistance to the point of connection between the two transformers acts as an equalizing connection to maintain a proper distribution of load upon the two groups of motors. As the controlling-switch is moved to positions 6, 7, and 8 resistance R is again gradually cut out, until in position 8 the resistance is entirely removed from the circuit, and the voltage impressed on the motors is twice that of position 4.

It will be seen that the system of control which I have disclosed renders it unnecessary to vary the connections of the motors. In this manner the motors may be left permanently connected in series, so that the current in the motor-circuit is kept at a minimum and the sizes of the connections and controlling-switches reduced. Furthermore, I avoid the use of a voltage-regulator, such as a transformer with a variable secondary. Such a regulator is objectionable, since in transferring from one transformer-lead to another it is necessary either to open-circuit the transformer or to short-circuit the portion of the transformer winding between the two taps. This results in objectionable sparking and rapid deterioration of the controlling-switch, which can be reduced to proper limits only by employing an expensive and complicated arrangement of the controlling-switch.

Although I have shown my invention as applied to four motors connected in two groups of two each, it is evident that the number of motors in each group may be anything desired, and the number of groups may also be varied, as well as the number of transformers or transformer secondaries. Consequently I do not desire to limit myself to the particular arrangement of parts shown; but I aim in the appended claims to cover all such modifications which are within the scope of my invention.

What I claim as new, and desire to secure by Letters Patent of the United States, is—

1. In combination, a plurality of alternating-current motors permanently connected in series, a resistance in circuit therewith, means for varying the voltage impressed on the motor-circuit, and means for varying the amount of resistance in said circuit.

2. In combination, a plurality of alternating-current motors, a resistance connected in circuit therewith, a plurality of transformer-windings adapted to supply current to the motors, means for connecting said windings in parallel and in series, and means for varying the amount of resistance in the motor-circuit.

3. In combination, a plurality of alternating-current motors permanently connected in series, a resistance connected in circuit therewith, a plurality of transformer-windings adapted to supply current to the motors, means for connecting said windings in parallel and in series, and means for varying the amount of resistance in the motor-circuit.

4. In combination, a plurality of alternating-current motors permanently connected in series, a resistance connected in circuit therewith, a plurality of transformer-windings adapted to supply current to said motors, means for connecting said windings in parallel and in series, means for varying the amount of resistance in the motor-circuit, and means for establishing a connection from a point between said motors to the point of connection between said transformer-windings when said windings are connected in series.

5. In combination, a plurality of alternating-current motors, a resistance in circuit therewith, and a controlling-switch adapted to vary the voltage impressed on the motor-circuit and to vary the amount of resistance in said circuit.

6. In combination, a plurality of alternating-current motors, a resistance in circuit therewith, a plurality of transformer-windings adapted to supply current to said motors, and a controlling-switch adapted to connect said transformer-windings in parallel and in series and to vary the amount of resistance in the motor-circuit.

7. In combination, a plurality of alternating-current motors, a resistance in circuit therewith, a plurality of transformer-windings adapted to supply current to said motors, and a controlling-switch adapted to connect said transformer-windings in parallel and in series, to vary the amount of resistance in the motor-circuit, and to establish a connection from a point between said motors to the point of connection between said windings when said windings are connected in series.

8. In combination, a plurality of alternating-current motors, a resistance in circuit therewith, a plurality of transformer-windings adapted to supply current to said motors, and a controlling-switch adapted to connect said transformer-windings in parallel and to said motors, then gradually to cut out said resistance, then to cut in said resistance and to connect said windings in series, and then gradually to cut out said resistance.

9. In combination, a plurality of alternating-current motors permanently connected in series, a resistance in circuit therewith, a plurality of transformer-windings adapted to supply current to said motors, and a controlling-switch adapted to connect said windings in parallel and to said motors, then gradually to cut out said resistance, then to cut in said resistance, to connect said windings in series and to connect a point between said motors to the point of connection between said windings, and then gradually to cut out said resistance.

10. In combination, a plurality of "inverted" repulsion-motors, a resistance connected in circuit with the armatures of said motors, a plurality of transformer-windings adapted to supply current to said armatures, a controlling-switch adapted to connect said transformer-windings in parallel and in series and to vary the amount of resistance in the armature-circuit, and a reversing-switch adapted to short-circuit the field of said motors on either of two lines at an angle to the line of magnetization produced by the armature-current.

11. In combination, a plurality of "inverted" repulsion-motors having their armatures permanently connected in series, a resistance connected in circuit with the armatures of said motors, a plurality of transformer-windings adapted to supply current to said armatures, a controlling-switch adapted to connect said windings in parallel and in series, to vary the amount of resistance in the armature-circuit, and to connect a point between said armatures to the point of connection between said transformer-windings when said windings are connected in series, and a reversing-switch adapted to short-circuit the field of said motors on either of two lines at an angle in the line of magnetization produced by the armature-current.

In witness whereof I have hereunto set my hand this 23d day of June, 1904.

CHARLES E. BARRY.

Witnesses:
BENJAMIN B. HULL,
HELEN ORFORD.